PORTABLE ARTILLERY SHIELD

Filed Oct. 25, 1951 4 Sheets-Sheet 1

INVENTOR.
Charles W. Raymond
BY
ATTORNEYS

INVENTOR.
Charles W. Raymond
BY [signature]
ATTORNEYS

Oct. 27, 1953 C. W. RAYMOND 2,656,765

PORTABLE ARTILLERY SHIELD

Filed Oct. 25, 1951 4 Sheets-Sheet 3

INVENTOR.
Charles W. Raymond
BY Willard J. Hodges Jr.
Joseph N. Crowe
ATTORNEYS

Oct. 27, 1953 C. W. RAYMOND 2,656,765

PORTABLE ARTILLERY SHIELD

Filed Oct. 25, 1951 4 Sheets-Sheet 4

INVENTOR.
Charles W. Raymond
BY Wilfred J. Hadges, Jr.
Joseph F. Gaines
ATTORNEYS Patented Oct. 27, 1953 2,656,765

UNITED STATES PATENT OFFICE 2,656,765

PORTABLE ARTILLERY SHIELD

Charles W. Raymond, Cambridge, N. Y.

Application October 25, 1951, Serial No. 253,185

9 Claims. (Cl. 89—36)

(Granted under Title 35, U. S. Code (1952), sec. 266)

The invention described herein may be manufactured and used by or for the Government for governmental purposes, without payment to me of any royalty thereon.

The present invention relates to portable military equipment, and more particularly to a wheeled artillery shield which may be towed as a trailer by a prime mover, and which is sufficiently heavily armored to provide an effective protective housing for observer personnel as well as for artillery field pieces and their gun crews, it being immune to any projectiles or hostile action except direct artillery hits, the invention providing such a mobile shield of the indicated type which also may serve as a transport vehicle for personnel, personnel gear, ammunition, and the like.

The invention has for a further object the provision of a combined transport vehicle and housing shield for artillery field pieces which permits substantially complete enclosure in the housing of the field piece (except for a short length of projecting muzzle when the piece is in service) and the gun crew serving the piece, the equipment being provided with adjustable armored aprons for effective protection of its wheeled mounts when in service while permitting the piece and shield equipment to be limbered up rapidly for a quick shifting of position when doing so becomes desirable or necessary under service conditions.

A still further object of the invention is to provide an item of armored vehicle which will house personnel and equipment for service as a forward command or observation post.

Further objects of the invention will become apparent as the description proceeds and the features of novelty will be pointed out in particularity in the appended claims.

The invention will be understood more readily by reference to the accompanying drawings in which.

Figure 3:
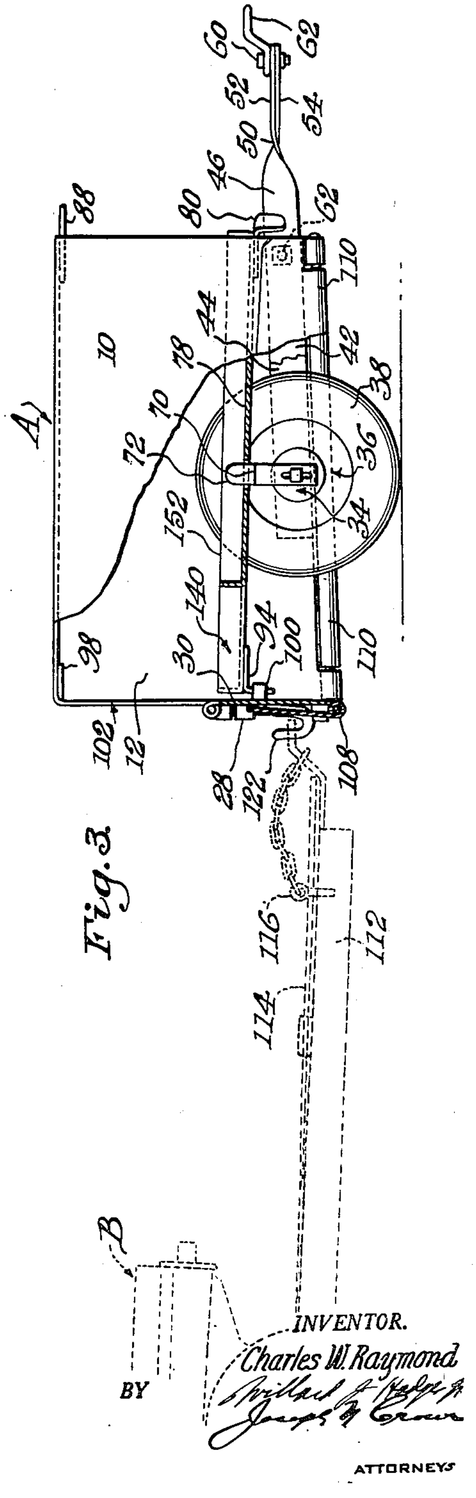
Fig. 3 is a side elevation partially in section of the equipment in transporting position.
Figure 6:
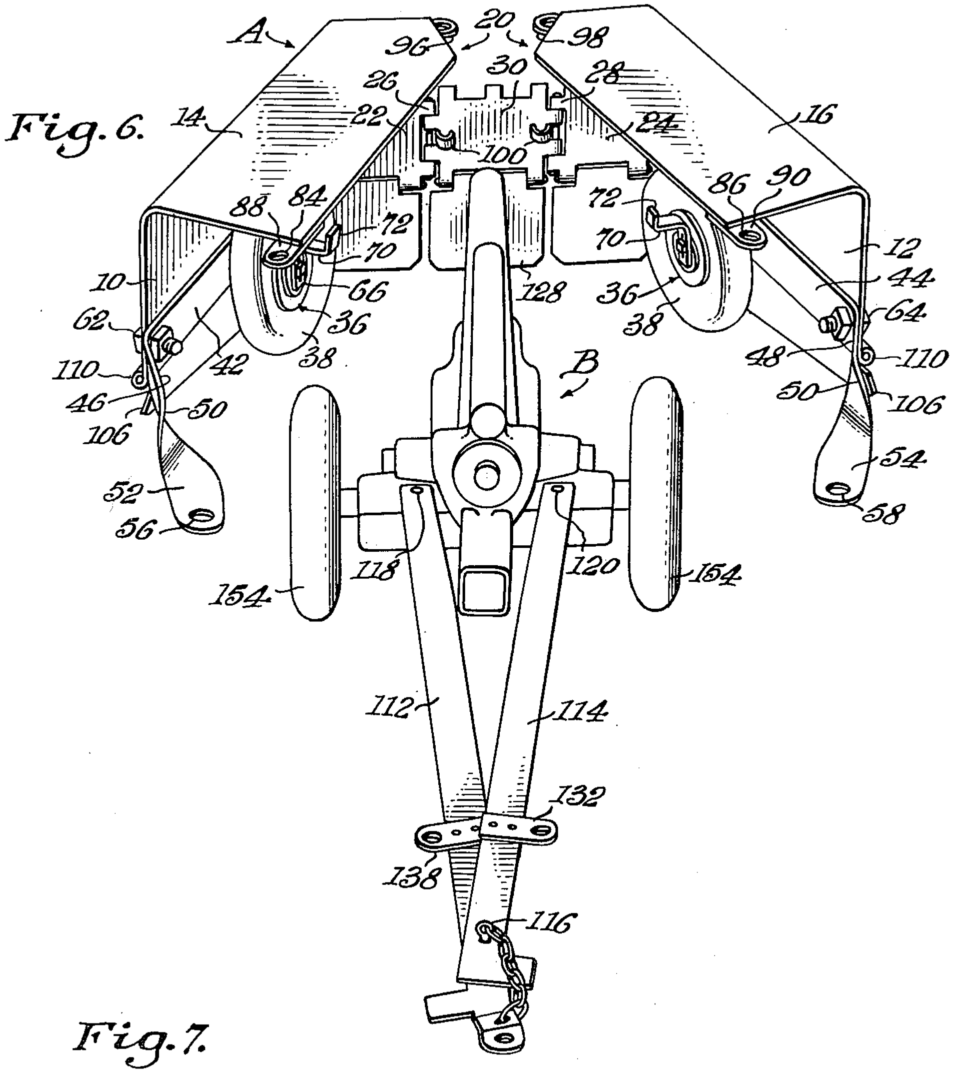
Fig. 6 is a rear perspective view of the equipment in operative position for receiving its artillery piece.
Figure 7:
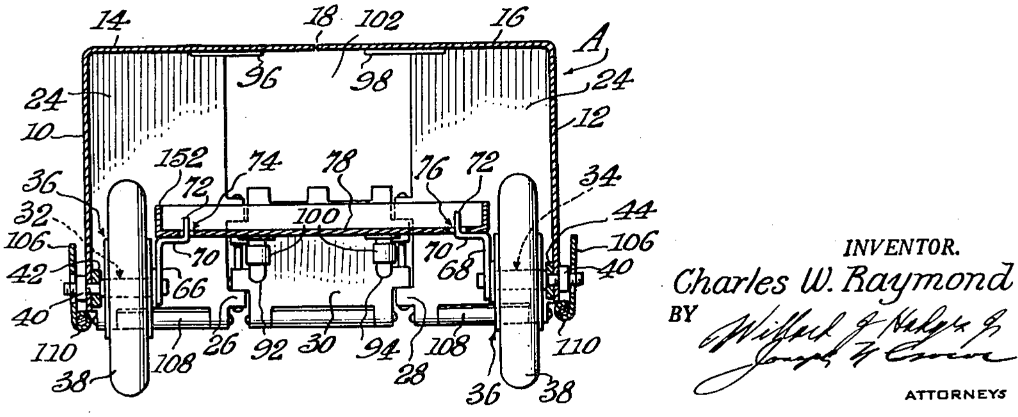
Fig. 7 is a transverse sectional view, taken on the line VII—VII of Fig. 1.

Referring more particularly to the drawings, it will be seen that the improved construction comprises a trailer-type vehicle built essentially of armor plate, and which may be coupled for transport in tandem with its artillery piece, the vehicle being indicated at A, the artillery piece being indicated at B, which may be coupled to the portable shield A and the latter to a common prime mover, not shown, the improved portable shield serving instead of a caisson for the artillery piece B when coupled in the train shown in Fig. 3.

Figures 1, 5:
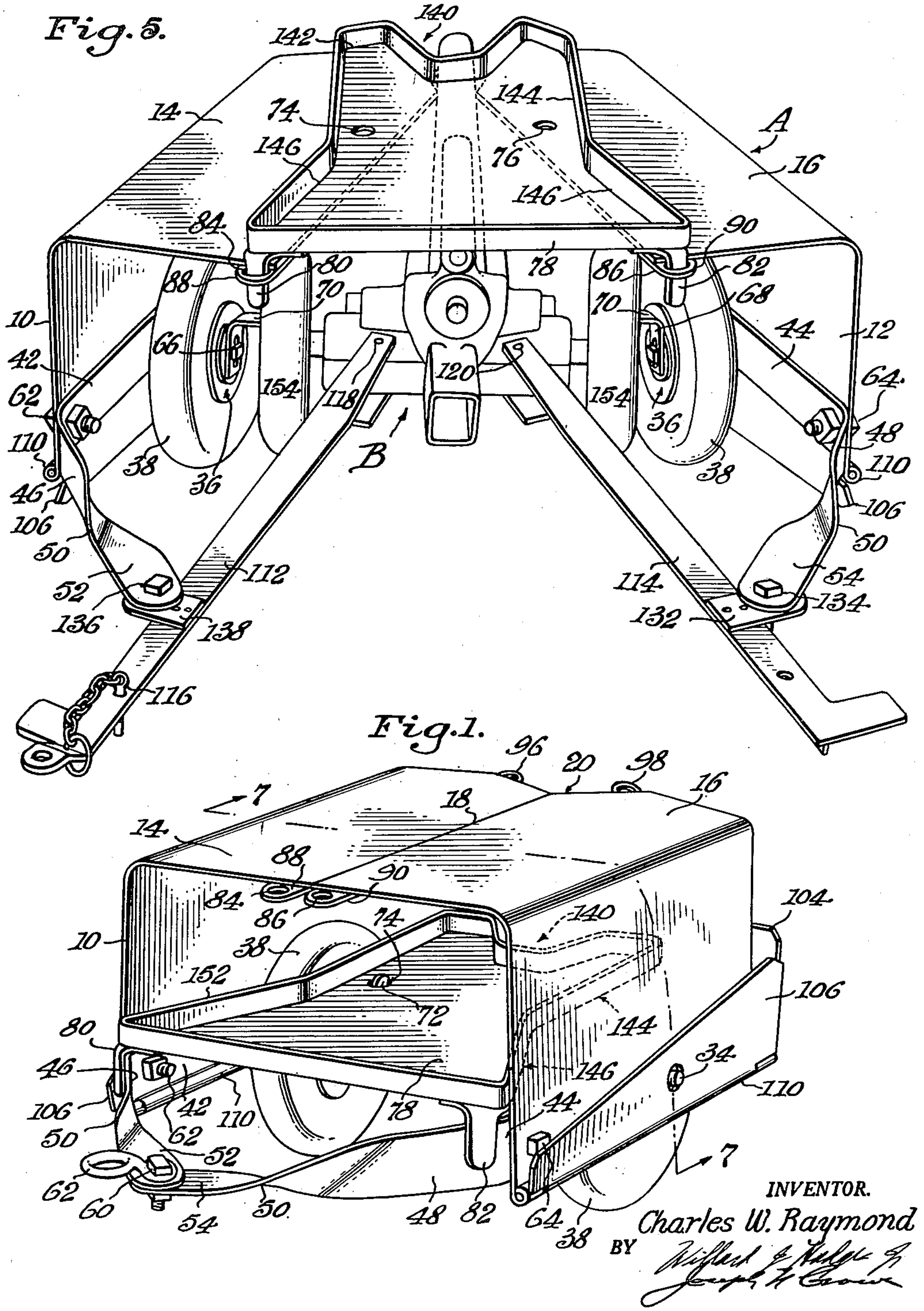
Fig. 1 represents a rear perspective view of the improved construction when in position and condition for transport thereof.
Fig. 5 is a rear perspective view of the equipment showing its mounting on the piece for service.
Figures 2, 8:
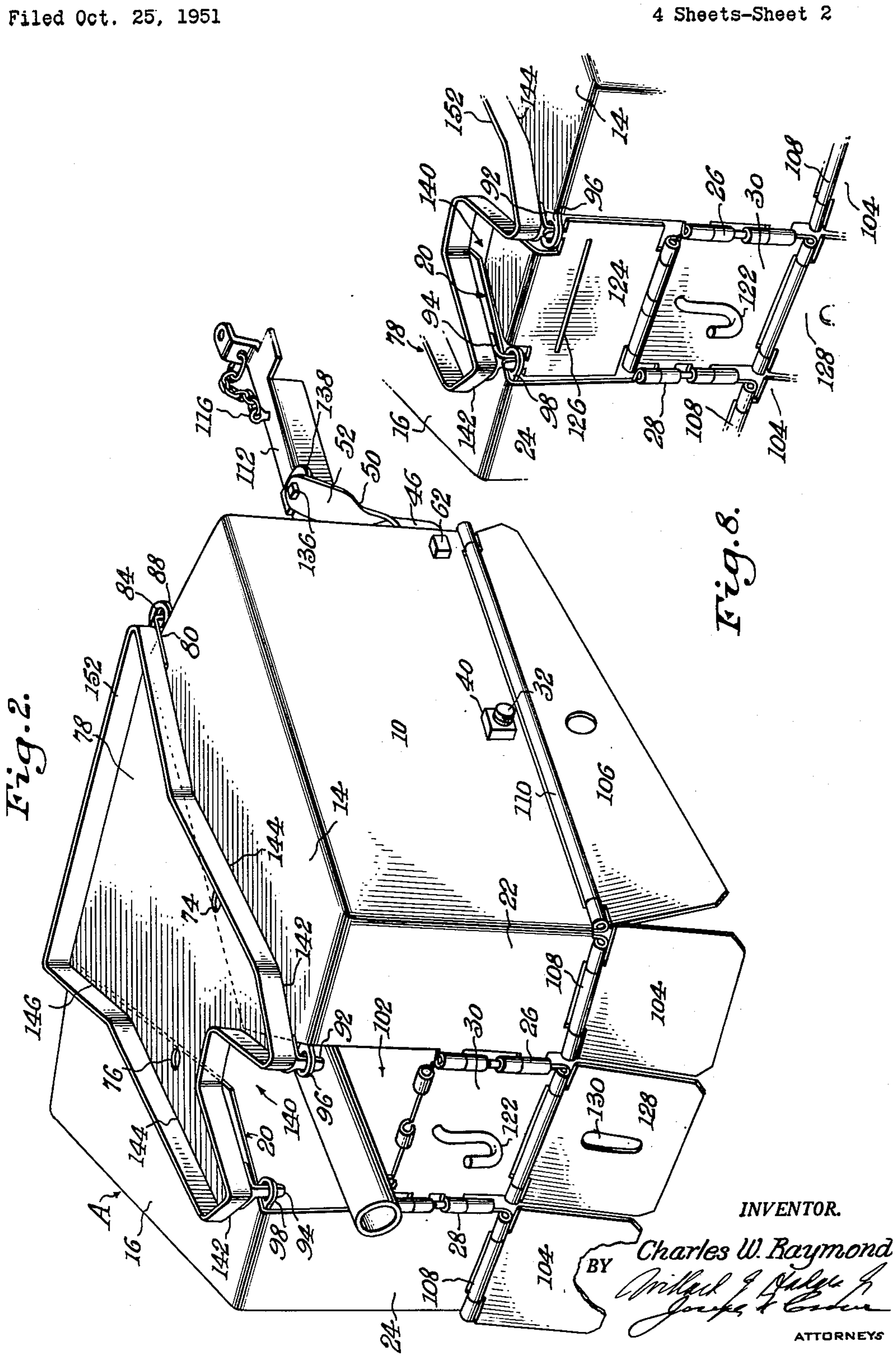
Fig. 2 is a perspective view of the improved device, the view showing it in service as a housing for an artillery field piece.
Fig. 8 is a fragmentary front perspective view of a modified form of the equipment serving as a forward command or observation post.
Figure 4:
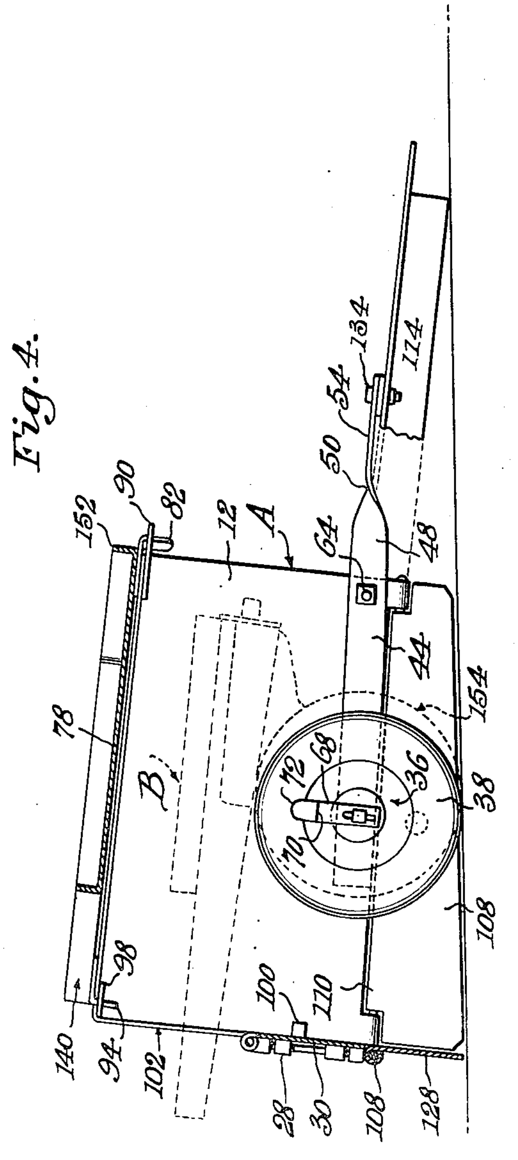
Fig. 4 is a side elevation partially in section of the equipment in the position shown in Fig. 2.

The improved portable shield of the present invention comprises lateral vertical plates 10 and 12 which are formed with substantially horizontal complementary top flanges 14 and 16 which fold together in abutting relation along a center line 18 when the vehicle is in transporting position, as shown in Fig. 1, adjacent front corners of these flanges being beveled to form a recess 20 for providing a clearance to enable pivotal separation of the resulting sections when it is desired to separate the parts of the assembly for reception of the artillery piece B. These side plates 10 and 12 also are formed with front walls 22 and 24 for forming an enclosed armored housing, the sections of which are pivotally mounted on vertical hinges 26 and 28 that are carried by the front plate 30 which connects the sections together.

Suitably mounted in the side plates 10 and 12 approximately midway the length thereof and adjacent to their lower edges, are stub axles 32 and 34 which carry the transporting wheels 36 provided with pneumatic tires 38; the stub axles being immovably locked against turning by lock nuts 40, the wheels 36 being turnable on the stub axles. The stub axles 32 and 34 also serve as mountings for longitudinally extending draw bars 42 and 44 that are projected rearwardly to form complementary trail members 46 and 48, these members 46 and 48 being turned through 90° as indicated at 50, to provide flatly overlying ends 52 and 54 having registering holes 56 and 58 therein for reception of an interlocking pintle bolt 60 which locks the sections of the shield together and which forms a mounting for a coupling eye member 62 by means of which the shield may be coupled to the prime mover for towing the shield during transportation thereof. The bar portions 42 and 44 of the trail members 46 and 48 are further secured to the side plates by bolts 62 and 64.

The stub axles 32 and 34 also form mountings for upstanding brackets 66 and 68, the upper ends of which are formed into angles having a horizontal web 70 and upstanding retaining ends 72 that are adapted to enter corresponding openings 74 and 76 in a removable tray 78, which rests upon the webs 70, and which carries on its rear corners depending brackets 80 and 82 which fit over the shield trail members 46 and 48 for supporting the tray 78. This tray is also made from armor plate, and when in position inside of the shield it functions as a carrier for personnel equipment, accoutrements and the like; and when removed for reception of the artillery piece B, with the shield sections separated, the tray 78 completes an armored cover for the shield, the brackets 80 and 82 being received in holes 84 and 86 provided therefor in rearwardly extending top brackets 88 and 90, and similar forwardly depending angle lugs 92 and 94 are received in forward eye members 96 and 98 provided therefor on the beveled front corners of the recess 20, these lugs 92 and 94 being received in eye brackets 100 projecting inwardly from the front closure plate 30 when the tray 78 is in traveling position.

It will be seen from the foregoing that the present construction provides a two-wheeled armored trailer-shield, capable of being split open, so that the artillery piece it accompanies can be emplaced in the shelter of its interior. The trailer-shield consists principally of an armor-plate cab, closed on the front, sides, and top, and open at the rear. The front face of the cab is provided with a gun-port 102 to allow the muzzle of the piece B to protrude from the interior. Folding aprons such as those designated 104 and 106 of armor plate may be fitted along the lower edges of the front and sides of the cab, by the provision of hinge members 108 and 110, which aprons may be lowered as desired to extend the protecting surfaces to the ground.

The two wheels are each mounted on a spindle or stub axle projecting from the inner surfaces of the right and left sides of the cab respectively. When in traveling position, a false axle (not shown on the drawings) can be interposed as a stiffener between the inner ends of the two spindles.

Resting within the enclosure of the shield-cab is the horizontal tray 78, which is anchored to the inner surfaces of the cab in such manner as to form a cargo floor, but which is readily detachable and removable from the cab shield. The tray serves as a structural stiffener for the cab when the shield is in travel. The cab is built in two halves hinged in the front vertical face close to the gun-port 102. The drawbar for the cab is of the split-trail type, the right and left trails being secured to the right and left halves of the cab respectively. After removing the cargo tray from the interior of the cab, and unlatching the trails, the empty trailer may be split open in much the same manner as the trails 112 and 114 of the piece B are spread, that is, by removing the latching pintle 116 and spreading the trails 112 and 114 by pivoting them on the pivotal connections 118 and 120 of the trails with the gun carriage. Because of the location of the hinges and the mounting of the wheels, the trailer must be drawn a short distance in the direction of road-travel so that the sections of the cab may be spread without scuffing of the tires or undue effort. To close the cab, a short forward movement will bring the two halves of the cab together into alignment for travel.

A towing pintle 122 is provided on the outside of the front vertical face of the cab so that when the vehicle is trailed behind a prime mover, an artillery piece B or another trailer may be coupled in trail as will be apparent from the drawings.

The cargo tray 78 is so designed that when the cab is in spread position, thus leaving a web-shaped void in the roof, the tray may be lifted and placed upon the top of the cab, thereby covering the overhead void and completing the roof. The roof of the cab, including the tray, may be so designed that an auxiliary covering of earth, gravel, planking, or other available material can be placed thereon to give added protection.

If it is desired to use the present construction as a splinter-proof command post, fire direction center, observation post, or the like, the gun-port 102 may be closed with a sheet of armor plate 124 having an observation slit or opening 126 therein; and a hingedly mounted front apron section 128 having a slot 130 therein for fitting over the towing pintle 122, also may be provided.

In operation, the present shield and piece being in train behind the prime mover, both are uncoupled and rotated by the crew as necessitated by the direction of fire. The cargo on the tray 78, if any, is unloaded, the tray is removed and the cab trails unlatched. The trailer shield then is drawn to the rear, the trails being spread and the halves of the cab are opened similar to opening a clam shell. The piece then is run forward into the cab until its muzzle protrudes through the gun-port. The piece trails are spread, and the right cab trail is latched by a bracket 132 provided on the piece trail for that purpose by insertion of a latching pintle or bolt 134, and the left cab trail is secured similarly to the left piece trail through insertion of pintle 136 through bracket 138, the pintles 134 and 136 being inserted through the same holes in the cab trails as receive the latching pintle 60 for completing the cab drawbar. The tray then is placed on top of the separated cab sections for completing the opening therebetween, and the aprons, if the cab is equipped therewith, are lowered. The piece and shielding cab now are in battery.

As will be understood, the trailer shield of the present construction is intended to accompany the towed artillery battery, particularly when frequent displacement of the battery and rapid occupation of positions preclude complete digging-in before opening fire. In a battery of divisional field artillery, for example, a minimum of seven of these shield constructions would provide one shelter for each piece and one to serve as a fire direction command and post for the battery executive.

A shield construction embracing the present features may be furnished to serve as a temporary splinter-proof shelter for vital installations of a command post; and also the present construction may be utilized, if properly concealed, as a readily movable, protected observation post for commanders of divisions, corps, and higher echelons. Furthermore, by virtue of its design to carry cargo, the present portable shield construction can be employed for ordinary transportation uses except when required in its principal role as armor protection. A pooling of the improved shields in the battalion service echelon or at some other rear element of the combat forces would best serve that purpose, while retaining the shields quickly available for reissue to firing batteries.

It will be observed further that when the tray 78 is mounted within the housing of the vehicle body, it spans the space between the sidewalls 10 and 12 and reinforces these sidewalls. Also, the tray 78 has a front end recess 140 that corresponds to the shape of the forward recess 20 between the sections of the housing when the sections are separated, the sides of the tray first diverging from this recess towards the rear end of the tray then becoming approximately parallel to a point rearwardly of the wheels 36 and tires 38 for clearing the wheels, and thence again expanding to the rear edge of the tray. The forward diverging portion of the tray 78 is indicated at 142, the approximately parallel portion at 144, and the rear diverging portion at 146, the entire tray being approximately wedge-shaped to correspond to the wedge-shaped opening between the sections, the bottom of the tray being, however, substantially wider than the width of the opening between the sections when the latter are in position of maximum separation. When in such position, the distance between the eye openings 84 and 86 of the rearwardly extending top brackets 88 and 90 corresponds to the space between the depending brackets or tongues 80 and 82 which are welded to the rear corners of the tray and which enter the eye openings 84 and 86 when the sections are at their maximum separation. The forward depending brackets or lugs 92 and 94 on the front end of the tray enter complementary eye openings in the forward brackets 96 and 98 mounted on the top of the sections at the forward corners of the recess 20 between the housing sections. The tray 78 is substantially wider throughout than the wedge-shaped opening between the sections at maximum separation between the sections for effectively covering this opening throughout the extent of the latter, thus affording complete armored top protection for the ordnance piece B and its operating personnel. An article retaining flange 152 extends completely around the periphery of the tray 78.

The carriage for the piece B is shown as being mounted on wheels 154. Obviously, the tray 78 must be removed from within the cab housing before the sections can be separated for reception of the piece B, and the locking pintle 116 must be removed from the trail members 112 and 114 before these members can be separated and interlocked with the drawbar parts 52 and 54 through the use of locking pintles 134 and 136 as aforesaid for running the piece in firing position.

While the illustrated form of the construction represents a typical and preferred embodiment of the improved features of the shield, it will be apparent that variations in structural details may be effected without departing from the inventive concept, and it will be understood accordingly that it is intended and desired to embrace within the scope of the invention such modifications and changes as may be necessary or desirable to adapt the invention to varying conditions and uses, as defined in the appended claims. Obviously, if the ordnance piece is a self-propelled gun, the prime mover for the train would be eliminated without change in the coupling means between the gun carriage trail and the shield of the present construction, which coupling means are readily disconnected for effecting a rapid shifting of the ordnance piece from position in train with the shield housing to firing position enclosed in the housing; and it will be understood that the invention contemplates the provision where the ordnance piece is self-propelled, rather than being towed by a prime mover in train with the shield construction as illustrated on the accompanying drawings.

Having thus described my invention, what I claim as new and wish to secure by Letters Patent is:

1. A portable ordnance shield, comprising an armored cab-like body open at its rear and including continuous side walls, a closed top and substantially closed front wall, means hingedly interconnecting the side walls and front wall while permitting separation of the side walls with accompanying opening of the top, a cargo tray removably mounted in the body, the said tray being designed in contour to cover completely the top opening in the body resulting from separation of the side walls when the tray is removed from its mountings in the said body while reinforcing the side walls when the tray is mounted in the body, wheels mounted on the side walls interiorly thereof for imparting portability to the shield, the contour of the tray adapting the tray to receiving the wheels between itself and the side walls, means for securing the tray in mounted position in the body when in closed position, and means for securing the tray on top of the said body when the side walls of the body are separated.

2. A portable ordnance shield comprising an armored cab-like housing comprising separable sections defining a substantially complete closure having front wall portions, side walls, and a closed top, means hingedly interconnecting the separable sections to a front wall portion so that a substantially wedge-shaped opening in the top of the housing is produced responsively to separation of the sections of the housing, while closing to a mating line contact when the sections are closed, an armored cover for covering the wedge-shaped opening, cooperating means on the sections and on the cover for removably holding the said armored cover in covering position on the opening when the sections are separated, and wheels mounted on the sections interiorly thereof and substantially entirely enclosed by the side walls of the housing for enabling transportation of the shield to a desired service station.

3. A portable ordnance shield comprising an armored cab-like housing comprising separable sections defining a substantially complete closure having front wall portions, side walls, and a closed top, means hingedly interconnecting the separable sections to an intermediate front wall portion for enabling a clamshell-like separation between the sections for reception of an ordnance piece to be housed by the shield, separation of the sections producing a wedge-shaped opening in the top of the housing, a forward top recess between the sections defined by complementary beveled edges diverging from the top line of separation between the sections to the top forward edges of the sections, the said recess permitting selected separation of the sections about the hinged connections therefor between the sections and the intermediate front wall section, the top of the sections closing to a mating top line contact when the sections are closed, the said mating line contact extending rearwardly from the said recess to the rear edge of the sections, an armored tray removably mounted in the housing extending from one side wall to an opposite side wall for reinforcing the side walls and also extending from the front wall portions to the rear of the housing, means removably securing the tray in the housing, the means also locking together the sections of the housing while the tray is mounted therein, the said tray being removable from the interior of the housing and positionable on the housing for defining an armored cover for the top wedge-shaped opening between the sections when the sections are separated, complementary means on the sections and on the tray for securing the tray in covering position on top of the separated sections, and wheels for mounting the housing for transportation thereof, the said tray having a forward end recess corresponding to the forward recess between the sections and side recesses for accommodating the said wheels, the said tray also having diverging sides extending rearwardly from the end recess conforming to the wedge-shaped top opening between the separated sections and completely covering the said opening.

4. A portable ordnance shield comprising an armored cab-like housing comprising separable sections defining a substantially complete closure having front wall portions, side walls, and a closed top, means hingedly interconnecting the separable sections to an intermediate front wall portion for enabling a clamshell-like separation between the sections for reception of an ordnance piece to be housed by the shield, a cargo carrying tray interchangeable between transporting position enclosed in the housing and covering position on top of the housing for covering a top opening produced by separation of the sections, means for removably mounting the tray in the housing while locking the sections against separation while the tray is positioned in the housing, means for removably securing the tray in covering position over the opening when the sections are separated, and a wheel mounting for the housing for enabling the housing to be transported to a selected service location.

5. A portable ordnance shield comprising an armored cab-like housing comprising a pair of complemental separable sections defining normally a complete closure having front wall portions, side walls, and a closed top, the said sections meeting in a mating line along the top, pivot means hingedly interconnecting the separable sections to an intermediate front plate portion for enabling a clamshell-like separation between the sections for reception of an ordnance piece to be housed by the shield, said piece including a split trail, a cargo-carrying tray interchangeable between transporting position enclosed in the housing and covering position on the housing for closing a top opening produced by separation of the sections, means for removably mounting the tray in the housing while locking the sections against separation while the tray is positioned in the housing, means for removably securing the tray in covering position closing the top opening when the sections are separated, wheeled mountings for the housing for enabling the housing to be transported to a selected location, complementary drawbar members on the sections, means for locking the said drawbar members together when the sections are closed, means on the drawbar members for receiving complementary separable parts of a split trail of the ordnance piece, and means for interlocking the said complementary separable parts of the trail to the drawbar members when the piece is in firing position in the housing.

6. A portable artillery shield comprising an armored cab-like housing comprising a plurality of hingedly interconnected sections adapted to be separated for receiving an ordnance piece, said piece including a split trail, the said housing enclosing the ordnance piece and having side walls and front wall portions, the said side walls having top flanges integral with the side walls and meeting in a top line contact when the sections are closed, hinge connections interconnecting the front wall portions, separation of the sections producing a wedge-shaped opening in the top of the housing, a tray-like cover for the said opening, means removably securing the said cover in covering position relative to the opening, the said cover being interchangeable between covering position on the opening and a load-carrying position enclosed in the housing when the sections are closed, wheel mountings for the housing, a drawbar structure for connecting the housing to a prime mover, the drawbar structure including separable sections carried by the side walls of the housing and terminating in interengaging free ends when the sections of the housing are closed, means interlocking the free ends together and including coupling means for coupling the drawbar to the prime mover for towing the housing as a trailer vehicle, means on the front wall portion for coupling the housing in train to the split trail of the ordnance piece to be received in the housing, the sections of the housing being recessed to form a gun-port for receiving the muzzle of the piece when the latter is in firing position in the shield with the sections of the housing separated to receive the said piece and the resulting intervening top opening between the sections closed with the said tray-like cover, and means for securing the trail of the ordnance piece to the drawbar sections when the housing sections are separated and the piece is in firing position between the separated sections, the coupling means between the drawbar of the housing and the prime mover and between the gun carriage trail and front wall portions of the housing including readily removable coupling pintles for rapidly uncoupling the housing from the gun carriage trail and from the prime mover for effecting rapid shifting of the ordnance piece from position in train with the housing into firing position enclosed in the housing.

7. An ordnance shield vehicle complement for an ordnance field piece adapted to be towed in a mobile artillery train which comprises a caisson type vehicle having a pair of armored mating clam shell segments each having a side wall, a top plate, a front wall, a stub axle, a wheel, and a trail, the aforesaid elements of one of the segments corresponding to and being complemental with respect to corresponding elements of the other segment, a front plate, and an armored tray; said front walls extending toward each other and being hinged to opposite edges of said front plate, said top plates extending toward each other, and terminating in mating edges, said stub axles being secured one in each said side wall and extending toward each other, said wheels being secured one on each axle, said trails being secured one along each side wall and extending therefrom remotely from said front walls and terminating in interlocking means for interlocking with each other when the segments are in closed position, wherein said mating edges are contiguous, and for interlocking with locking means on the trails of an ordnance field piece when the segments are in open position, wherein said mating edges are spaced one from the other, means on said front plate, stub axles and trails of the vehicle for supporting and removably securing the tray within the vehicle when the segments are in closed position and means on said top plates for supporting and removably securing the tray on top of and across the space between said mating edges when the segments are in open position.

8. An ordnance shield vehicle complement for an ordnance field piece comprising a pair of armored mating clam shell segments each having a side wall, a side wall apron, a top plate, a front wall, a front wall apron, a stub axle, a wheel, and a trail, the aforesaid elements of one of the segments corresponding to and being complemental with respect to corresponding elements of the other segment, a front plate, a front plate apron, and an armored tray, said front walls extending toward each other and being hinged to opposite edges of said front plate, said top plates extending toward each other and terminating in mating edges, said stub axles being secured one in each said side wall and extending toward each other, said wheels being secured one on each axle, said trails being secured one along each side wall and extending therefrom remotely from said front walls and terminating in interlocking means for interlocking with each other when the segments are in closed position, wherein said mating edges are contiguous, and for interlocking with locking means on the trails of an ordnance field piece when the segments are in open position, wherein said mating edges are spaced one from the other, means on said front plate, stub axles and trails of the vehicle for supporting and removably securing the tray within the vehicle when the segments are in closed position and means on said top plates for supporting and removably securing the tray on top of and across the space between said mating edges when the segments are in open position, said side wall aprons, front wall aprons and front plate apron being hingedly attached to the bottom edges of the respective side walls, front walls and front plate so that the protective surface formed thereby may be extended to ground level when the vehicle is immobile.

9. The structure of claim 8 wherein the adjacent edges of the front plate and the top plates are spaced from each other to form a gun port for an accompanying ordnance field piece.

CHARLES W. RAYMOND.

References Cited in the file of this patent

UNITED STATES PATENTS

| Number | Name | Date |
|---|---|---|
| 1,213,074 | Clark | Jan. 16, 1917 |
| 1,246,662 | Ruzycki | Nov. 13, 1917 |
| 1,281,400 | Larnell | Oct. 15, 1918 |
| 2,209,654 | Loeser | July 30, 1940 |